(12) United States Patent
Takasaki et al.

(10) Patent No.: US 10,709,963 B2
(45) Date of Patent: Jul. 14, 2020

(54) GAME SYSTEM AND IMAGE DISPLAY METHOD

(71) Applicant: SEGA SAMMY CREATION INC., Yokohama-shi, Kanagawa (JP)

(72) Inventors: Yuichi Takasaki, Tokyo (JP); Takashi Hasegawa, Tokyo (JP)

(73) Assignee: SEGA SAMMY CREATION INC., Yokohama-shi, Kanagawa (JP)

(*) Notice: Subject to any disclaimer, the term of this patent is extended or adjusted under 35 U.S.C. 154(b) by 0 days.

(21) Appl. No.: 15/532,679

(22) PCT Filed: Oct. 26, 2015

(86) PCT No.: PCT/JP2015/080151
§ 371 (c)(1),
(2) Date: Jun. 2, 2017

(87) PCT Pub. No.: WO2017/072839
PCT Pub. Date: May 4, 2017

(65) Prior Publication Data
US 2017/0340953 A1 Nov. 30, 2017

(51) Int. Cl.
*A63F 9/24* (2006.01)
*A63F 13/00* (2014.01)
(Continued)

(52) U.S. Cl.
CPC .............. *A63F 1/18* (2013.01); *A63F 13/80* (2014.09); *G07F 17/3211* (2013.01); *G07F 17/3293* (2013.01)

(58) Field of Classification Search
CPC ..................... A63F 13/798; G07F 17/3276
See application file for complete search history.

(56) References Cited

U.S. PATENT DOCUMENTS 5,779,549 A * 7/1998 Walker ............... A63F 13/12
463/23
5,816,918 A 10/1998 Kelly et al.
(Continued)

FOREIGN PATENT DOCUMENTS

CN 1178952 A 4/1998
CN 101095987 A 1/2008
(Continued)

OTHER PUBLICATIONS

Office Action issued in related application CN 201580060641.9, dated Apr. 8, 2020, with machine generated English language translation, 13 pages.

*Primary Examiner* — Kang Hu
*Assistant Examiner* — Jason Pinheiro
(74) *Attorney, Agent, or Firm* — Faegre Drinker Biddle & Reath LLP

(57) ABSTRACT

A game system comprises a game progress control unit which allows a plurality of games to progress, a win and loss history managing unit which manages a win and loss history of each of the plurality of games, and an image generating unit which generates a game image comprising a win and loss history image representing the win and loss history. The win and loss history managing unit determines whether the win and loss history meets a predetermined highlight condition, and allows highlighting to be performed on the win and loss history image corresponding to the win and loss history determined to meet the highlight condition. This allows intuitive recognition of any of a plurality of games that has enhanced expectation.

9 Claims, 15 Drawing Sheets

(51) Int. Cl.
*G06F 17/00* (2019.01)
*A63F 1/18* (2006.01)
*A63F 13/80* (2014.01)
*G07F 17/32* (2006.01)

(56) References Cited

U.S. PATENT DOCUMENTS

| | | | | |
|---|---|---|---|---|
| 8,550,920 | B1* | 10/2013 | Allen | G07F 17/3241 |
| | | | | 463/25 |
| 8,768,764 | B1* | 7/2014 | Paharia | G06Q 30/0269 |
| | | | | 705/14.27 |
| 8,821,275 | B2* | 9/2014 | Apirian | G07F 17/3276 |
| | | | | 463/31 |
| 2004/0023734 | A1* | 2/2004 | McClain | A63B 24/0084 |
| | | | | 473/409 |
| 2006/0071429 | A1 | 4/2006 | Okujyo et al. | |
| 2007/0060267 | A1 | 3/2007 | Okada | |
| 2008/0032760 | A1 | 2/2008 | Yoshizawa | |
| 2008/0113805 | A1* | 5/2008 | David | A63F 13/12 |
| | | | | 463/42 |
| 2011/0105207 | A1 | 5/2011 | Chun | |
| 2011/0201400 | A1 | 8/2011 | Kido et al. | |
| 2012/0190429 | A1 | 7/2012 | Svarichevsky et al. | |
| 2013/0275231 | A1* | 10/2013 | Paharia | G06Q 30/0269 |
| | | | | 705/14.66 |
| 2014/0040263 | A1* | 2/2014 | Sherman | G06F 16/00 |
| | | | | 707/737 |

FOREIGN PATENT DOCUMENTS

| | | |
|---|---|---|
| JP | 11-267264 A | 10/1999 |
| JP | 2002-017943 A | 1/2002 |
| JP | 2005-168664 A | 6/2005 |
| JP | 2006-304873 A | 11/2006 |
| JP | 2007-075346 A | 3/2007 |
| JP | 2008-012110 A | 1/2008 |
| JP | 2009-247375 A | 10/2009 |
| WO | 2010/050398 A1 | 5/2010 |

* cited by examiner

GAME SYSTEM AND IMAGE DISPLAY METHOD

CROSS-REFERENCE TO RELATED APPLICATIONS

This application is the U.S. national phase of the International Patent Application No. PCT/JP2015/080151 filed Oct. 26, 2015, the entire content of which is incorporated herein by reference.

TECHNICAL FIELD

The present disclosure relates to a game apparatus and a card game apparatus.

BACKGROUND

Game apparatuses have been developed which enable traditional card games to be electronically played on a computer. For example, baccarat, which is a typical card game, is a game in which a user makes a bet in accordance with a prediction of a win and a loss in a card game between a banker and a player. The user only predicts the win and loss in the game, and the baccarat is popular in casinos throughout the world because of its convenience and the like. A dealer deals each of the banker and the player two or three cards in accordance with a certain rule, and the banker or the player wins whose total of the numbers in the cards is closer to "9". The user makes a bet in accordance with a prediction of whether the banker will win (BANKER) or the player will win (PLAYER) or the game will end in a tie (TIE). The amount of the bet can be optionally named by the user, and if the user's prediction is correct, the user receives a dividend corresponding to the bet amount. A game apparatus has been disclosed which is configured to enable the baccarat to be electronically played (see, for example, Patent Publication JP-A-H11-267264).

SUMMARY

In recent years, game systems have been able to be configured in which a plurality of game apparatuses and a plurality of terminal apparatuses are connected together via communication lines. In such a game system, a user operating the terminal apparatus can select one of the plurality of game apparatuses for execution. In selecting the game apparatus, the user makes the selection based on a selection criteria of which of the game apparatuses is advantageous for the user to play on or is enjoyable to the user.

However, due to continuous increase in the scale of the game system and in the number of selectable game apparatuses, it becomes more difficult for the user to determine, in a short period of time, which of the game apparatuses meets the user's selection criterion. Specifically, if the game apparatuses are for the above-described baccarat, a period during which the user may select from the game apparatuses is limited to a bet period of a short length of time before dealing of cards. Intuitively determining and selecting, in such a short time, a game apparatus that seems to meet the selection criterion is generally difficult. Expectation from the user is higher when the user plays a game on a game apparatus estimated to be more advantageous to the user, thus inspiring the user's motivation to join the game.

The present disclosure has been developed in consideration of the above-described circumstances. An object of the present disclosure is to provide a game system and an image display method in which, when selection from among a plurality of games is possible, a user's game selection is assisted and a player's game selection is facilitated.

Solution to Problem (1) To accomplish the above-described object, a game system according to the present disclosure comprises a game progress control unit which allows a plurality of games to progress, a win and loss history managing unit which manages a win and loss history of each of the plurality of games, and an image generating unit which generates a game image comprising a win and loss history image representing the win and loss history. The win and loss history managing unit determines whether the win and loss history meets a predetermined highlight condition, and allows highlighting to be performed on the win and loss history image corresponding to the win and loss history determined to meet the highlight condition.

To accomplish the above-described object, an image display method for a game system according to the present disclosure comprises the steps of allowing a plurality of games to progress, managing a win and loss history of each of the plurality of games, and generating a game image comprising a win and loss history image representing the win and loss history. The step of managing the win and loss history comprises determining whether the win and loss history meets a predetermined highlight condition. The step of generating the game image comprises allowing highlighting to be performed on the win and loss history image corresponding to the win and loss history determined to meet the highlight condition.

The present disclosure preferably comprises the following aspects.

(2) The game system further comprises a highlight condition storage unit which pre-stores the highlight condition and a highlight condition input unit which receives and stores a new highlight condition in the highlight condition storage unit. The win and loss history managing unit determines whether the win and loss history meets one or more highlight conditions stored in the highlight condition storage unit.

(3) The game progress control unit allows the plurality of games to progress in synchronism.

(4) The highlighting comprises adding a highlight image for predetermined highlighting to the corresponding win and loss history image.

(5) The highlighting comprises changing a display mode of an icon indicative of the win and loss history displayed at a position of the corresponding win and loss history image where the win and loss history meets the highlight condition.

(6) The display mode of the icon is one or more of:
1) a moving image into which the icon is converted;
2) a three-dimensional image into which the icon is converted; and
3) an animated image of an area containing the icon.

(7) The image generating unit generates a character image corresponding to each of the plurality of games and displayed along with the win and loss history, and the highlighting comprises changing a display mode of the character image displayed along with the corresponding win and loss history image.

According to the present disclosure, the win and loss history of the game meeting the highlight condition is highlighted. Thus, the user's desired one of the plurality of games can be suggested in an emphatic manner, facilitating the user's game selection.

DETAILED DESCRIPTION

Figure 1:
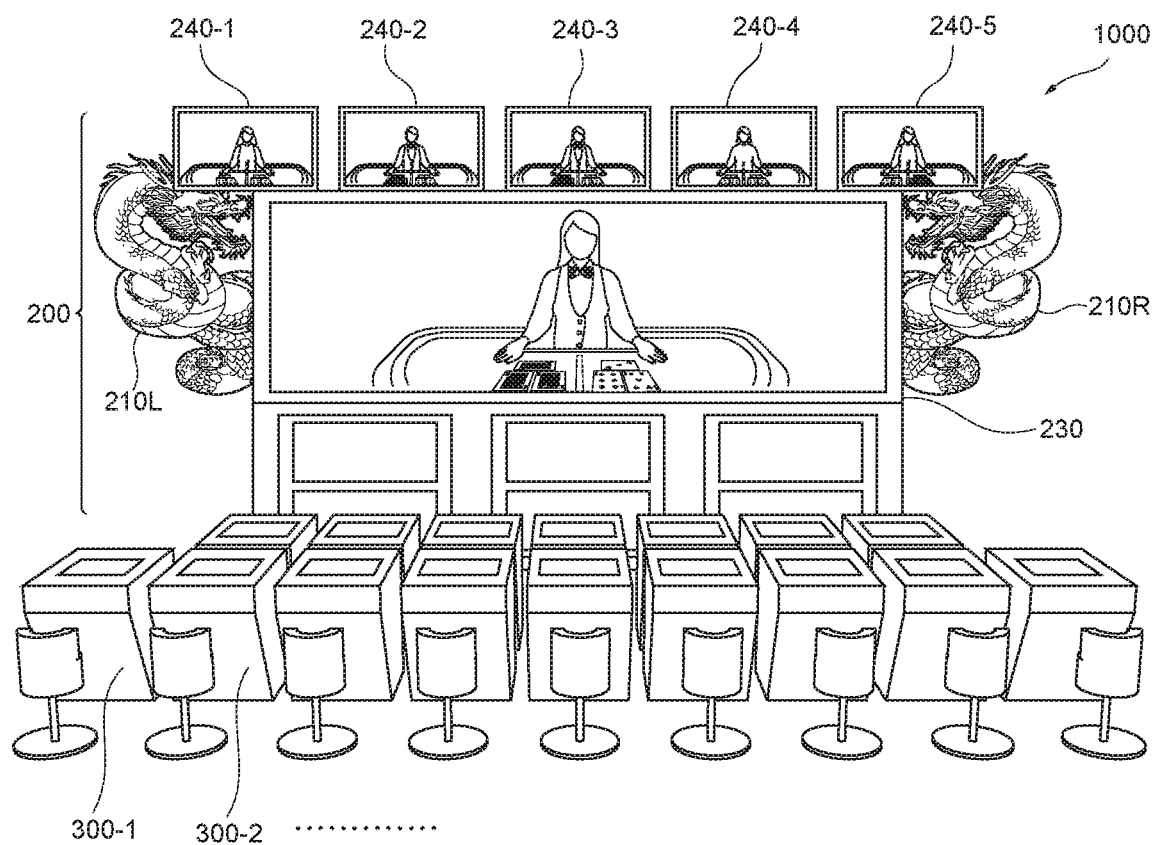
FIG. 1 is a diagram of an external configuration of a card game system according to an embodiment.

Embodiments of the present disclosure will be described. The embodiments described below are examples for describing the present disclosure and is not intended to be limited only to the embodiments. Furthermore, many variations may be made to the present disclosure without departing from the spirits of the disclosure. Moreover, those skilled in the art may adopt embodiments in which components described below are replaced with equivalent components, and such embodiments are also included in the scope of the present disclosure. Furthermore, positional relations such as right and left, and up and down are based on illustrations in the drawings unless otherwise specified. Moreover, various types of dimensional ratios in the drawings are not limited to the illustrated dimensional ratios.

In the embodiments described below, a card game system is illustrated which is configured to enable baccarat, which is a typical card game, to be carried out. However, the type of the card game is not limited, and the present disclosure is applicable to any other type of card game. Furthermore, the game is not limited to the card game, and the present disclosure is applicable to any other type of game.

0. Definition

In the specification, terms are defined as follows.

"User": refers to as a participant in a card game who makes a bet in accordance with a prediction of a win and a loss in a card game on a card game system. The user participates in a card game through a station which is an operation console.

"Baccarat": a traditional card game in which the user makes a bet in accordance with a prediction of a win and a loss in a card game between a banker and a player. The user only predicts the win and loss in the game, and the baccarat is popular in casinos throughout the world because of its convenience and the like. A dealer deals the banker and players two or three cards in accordance with a certain rule, and the banker or the player who is dealt cards whose first digit total amounts to closer to "9", wins the game.

"Bet": refers to expression of the user's prediction. Specifically, the user predicts whether the banker will win (BANKER) or the player will win (PLAYER) or the game will end in a tie (TIE), and makes a bet in accordance with the prediction.

"Bet amount": each user can optionally name the bet amount, and if the user's prediction is correct, the user may obtain a dividend corresponding to the bet amount.

"Bet areas": virtual areas in which the user makes a bet and which are prepared depending on whether the banker will win (BANKER) or the player will win (PLAYER) or the game will end in a tie (TIE).

"Tables": virtual tables which are used for dealers to handle cards in actual casinos and which replicate card tables. In the card game system of the present embodiments, five tables are provided.

"Moving images": a group of sequential frame images which allow, when consecutively displayed at every predetermined synchronizing period, an object to appear to move. Examples of a recording form for moving images include a recording form in which images are compressively encoded in accordance with standard moving image standards such as MPEG (Moving Picture Experts Group). In the specification, the moving images mean both a group of sequential frame images and data itself resulting from compressive encoding of the frame images, and moving images themselves displayed by reproducing the data.

"Winning and losing history": a history which indicates the results of past games on the assumption that the same game is repeated a plurality of times. For baccarat, the win and loss history refers to data which indicates whether the banker or the player has won or the game has ended in a tie and which is recorded in a time-series order and accordance with a predetermined rule. The win and loss history comprises not only results indicative of a win of one of the banker and the player and a loss of the other but also the results of already ended games recorded in accordance with a certain rule.

"Highlight": means that, if the win and loss histories for a plurality of games are displayed in parallel, at least a difference of a particular game from the other games can be visually recognized.

"Highlight condition": refers to a pattern which appears when the win and loss histories are displayed in accordance with a given display rule.

1. Configuration of the Main Body

FIG. 1 depicts a diagram of a general external configuration of a card game system according to the present embodiment. As depicted in FIG. 1, a card game system 1000 comprises a main body 200 with a large main display 230 arranged in the center of the system 1000 and a plurality of station apparatuses 300-1, 300-2, . . . 300-N (N is a natural number; All the stations are hereinafter representatively referred to as a station 300).

In an upper portion of the main body 200, five sub-displays 240-1 to 240-5 (all the sub-displays are hereinafter representatively referred to as a sub-display 240) are arranged. Around the sub-displays 240-1 to 240-5, light emitting diodes (LEDs) 212-1 to 212-5 (all the light emitting diodes are hereinafter representatively referred to as a light emitting diode 212), respectively, are arranged (see FIG. 2). On lateral sides of the main body 200, pictures of dragons or the like are drawn on decorative panels of acrylic or the like, and behind the decorative panels, a right lamp 210R and a left lamp 210L (the lamps are hereinafter collectively referred to as a lamp 210). Furthermore, the decorative panels on the lateral sides of the main body 200 are provided with speakers 220 not depicted in the drawings (see FIG. 2).

Figure 2:
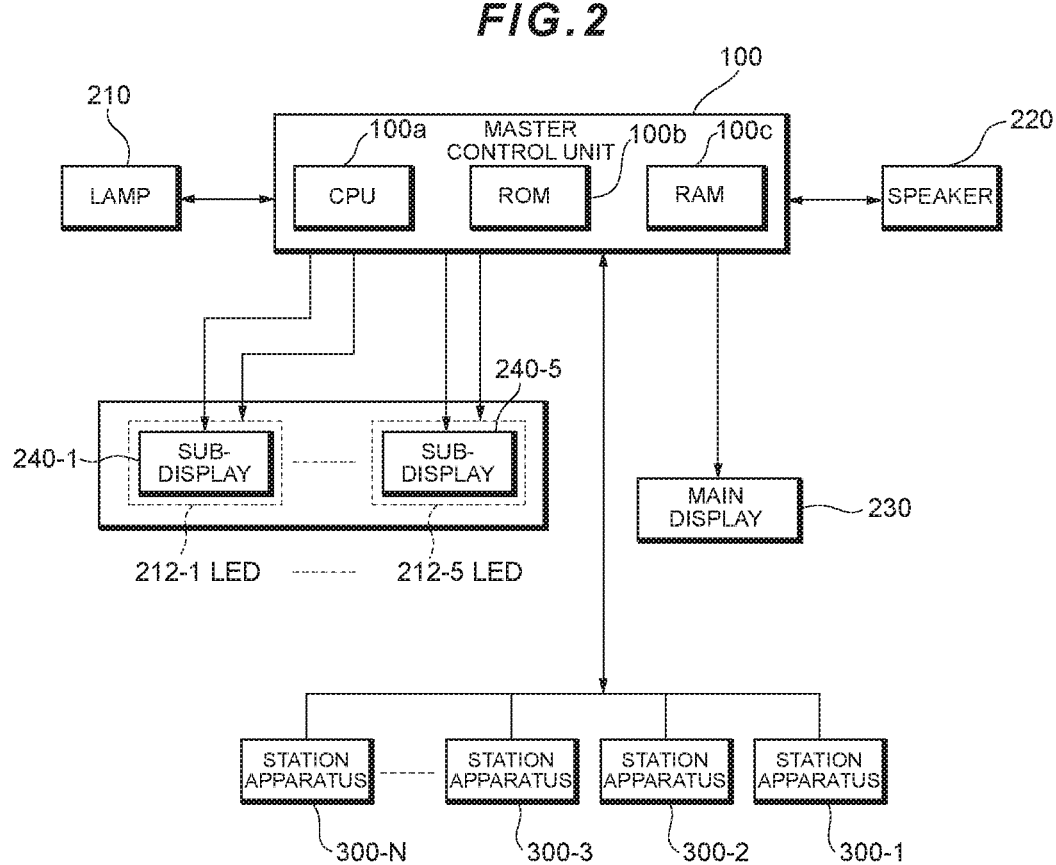
FIG. 2 is a block diagram of the card game system according to the embodiment.

FIG. 2 depicts a diagram of a card game system according to Embodiment 1. In the card game system 1000 according to the present embodiment, a master control unit 100 is communicatively connected to each station apparatus 300 as depicted in FIG. 2.

The master control unit 100 comprises, as physical electronic components, a CPU (Central Processing Unit) 100a, a ROM (Read Only Memory) 100b, and a RAM (Random Access Memory) 100c, and has a basic configuration of a general-purpose computer apparatus. Although not depicted in the drawings, the master control unit 100 included other needed components, for example, a display controller, a hard disk, and an interface apparatus. The ROM 100b stores programs for the game system such as an initial program loader used to start the system. The programs for the game system include software programs used to allow execution of the image display method in accordance with the present disclosure. The RAM 100c is a memory means utilized as a temporary storage area by the CPU 100a.

Furthermore, the master control unit 100 transmits and receives data to and from each station apparatus 300 via an interface apparatus not depicted in the drawings. Furthermore, the master control unit 100 can output an illumination control signal to the lamps 210 to controllably allow the lamps 210 to provide illumination, output an acoustic control signal to the speakers 220 to allow the speakers 220 to deliver a predetermined sound, and output a light emission signal to the light emitting diodes 212 to controllably turn on and off the light emitting diodes 212.

The master control unit 100 can further output a main image display signal to the main display 230 to allow the main display 230 display an image of a card game and output a sub-image display signal to sub-displays 240 to allow the sub-displays 240 to display respective images of the card game. Here, the image displayed on the main display 230 may be the same as the image displayed on any one of the sub-displays 240 or may be unique.

2. Configuration of the Station Apparatus

Figure 3:
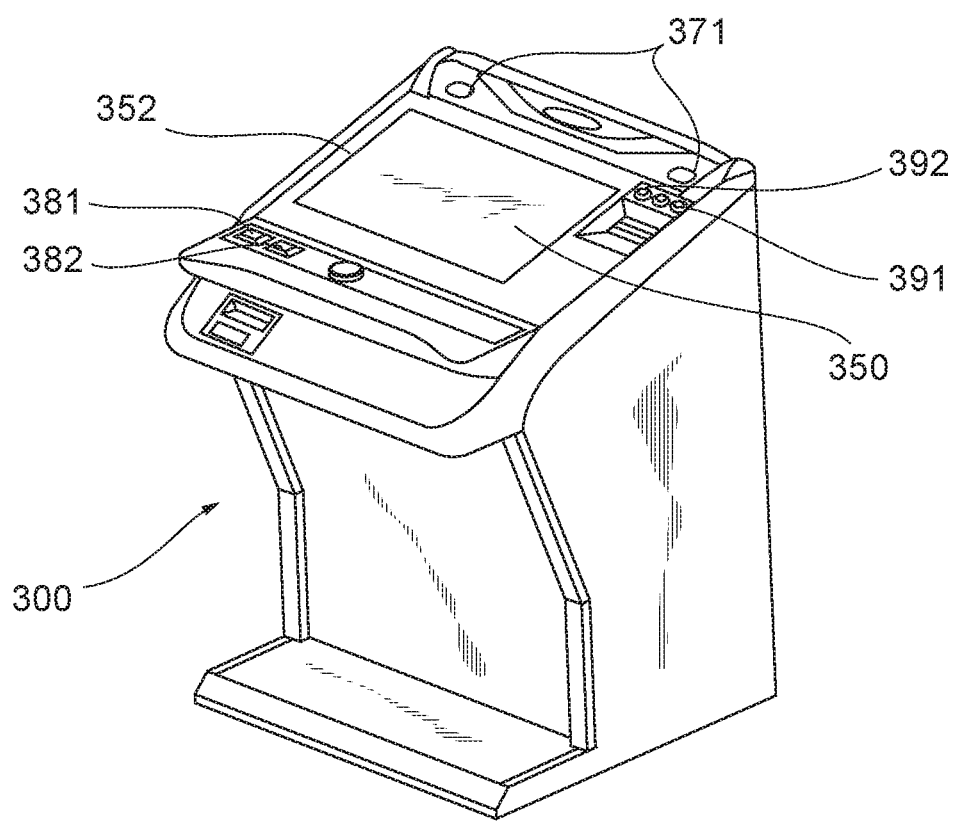
FIG. 3 is a perspective view of the appearance of a station apparatus according to the embodiment.
Figure 4:
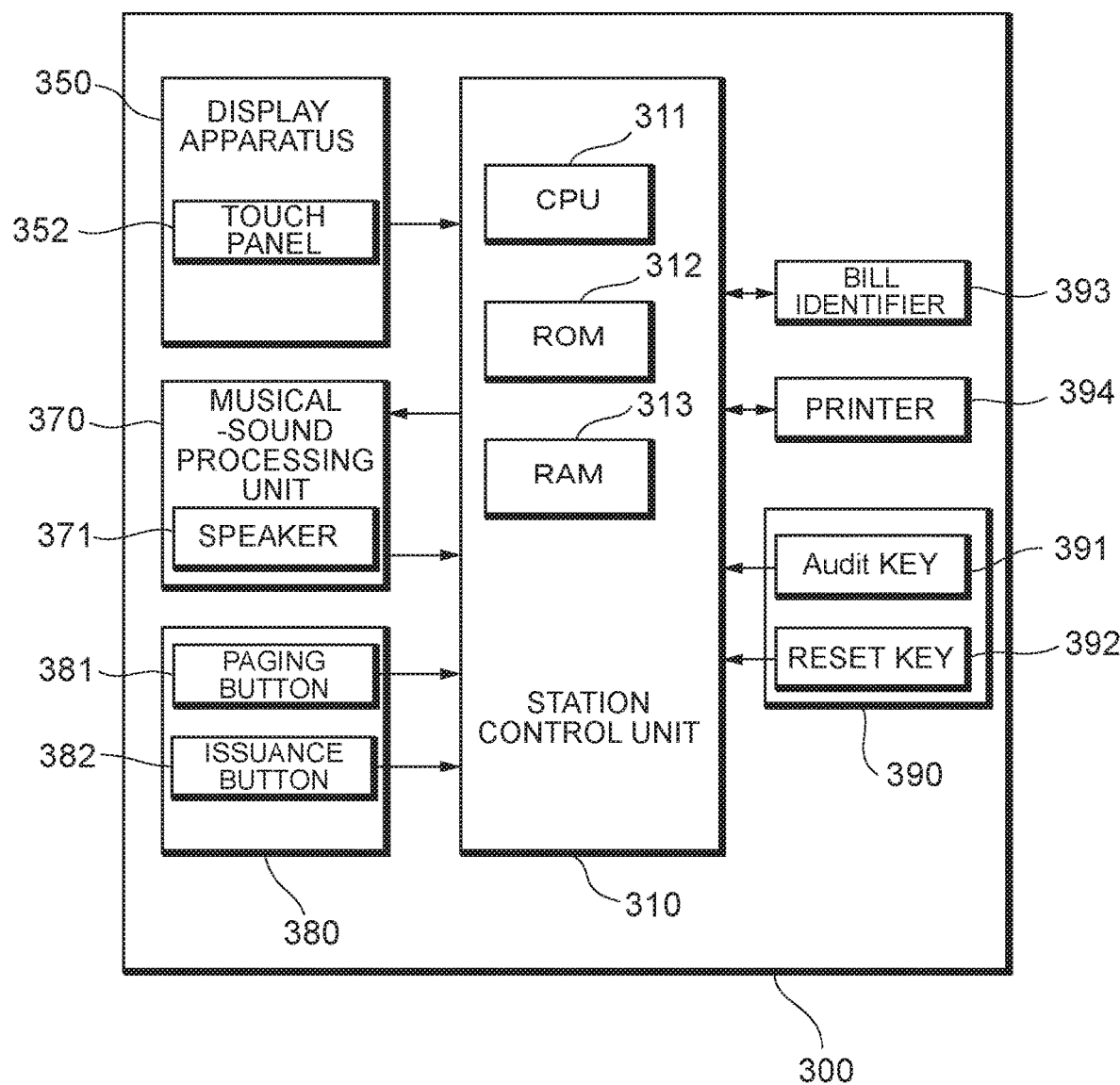
FIG. 4 is a functional block diagram of the station apparatus according to the embodiment.

FIG. 3 depicts a perspective view schematically illustrating the appearance of the station apparatus 300. FIG. 4 depicts a functional block diagram the station apparatus 300.

The plurality of station apparatuses 300 is terminal apparatuses (operating consoles) at which users are seated in order to participate in a card game (see FIG. 1). As depicted in FIG. 3 and FIG. 4, the station apparatus 300 comprises a station control unit 310, a display apparatus 350, a musical-sound processing unit 370, a group of operation buttons 380, a group of setting keys 390, a bill identifier 393, and a printer 394.

The station control unit 310 comprises components of a computer such as a CPU 311, a ROM 312, and a RAM 313. The CPU 311 integrally controls the units of the station apparatus 300 by utilizing various control programs and control data stored in the ROM 312 and the RAM 313. The ROM 312 and the RAM 313 store algorithms needed to calculate dividends and to display the dividends for the station apparatuses 300, and the like.

The display apparatus 350 displays an image of a selected one of the plurality of card games under the control of the station control unit 310. A touch panel 352 is provided on a front surface of the display apparatus 350 and functions as a part of an operation unit which reflects the contents of the user's operation. The touch panel 352 is utilized to perform various operations (an operation of placing a bet with chips and the like) relating to the card game and to select a desired one of the plurality of card games. The user operates the touch panel 352, and selection of any one of the card games allows a game image generated for the selected card game to be displayed on the display apparatus 350.

The musical-sound processing unit 370 reads and reproduces musical sound data and the like stored in the various memories and storage media to generate sound effects, musical sounds, or the like which are provided for various renditions. Generated musical sounds such as sound effects are output to the exterior via speakers 371.

The group of operation buttons 380 comprises a paging button 381 used to page a clerk when a trouble or the like occurs, and an issuance button 382 that requests issuance of a ticket corresponding to a credit. All of these operation buttons can be operated by the user.

The group of setting keys 390 comprises an audit key 391 used to set and test the station apparatus 300 and to display accounting information and a reset key 392 operated by a clerk to issue a ticket or the like. These keys can be set and operated by an operator of a play facility or the like.

The bill identifier 393 is an apparatus which identifies, when the user participates in a card game and the like, the type and amount of a bill (for example, a Japanese yen bill or Hong Kong dollar bill) inserted via a cash slot. The printer 394 is an apparatus which prints a ticket issued, for example, after the game ends.

The image displayed on the display apparatus 350 of each station apparatus 300 is an image for the card game selected at the station apparatus 300 and is the same as the image displayed on any one of the sub-displays 240. However, by the user operation, an image (a table view described below)

can also be displayed which is taken from a viewpoint different from the viewpoint for the image displayed on the sub-display 240.

3. Flow of a Card Game

Figure 5:
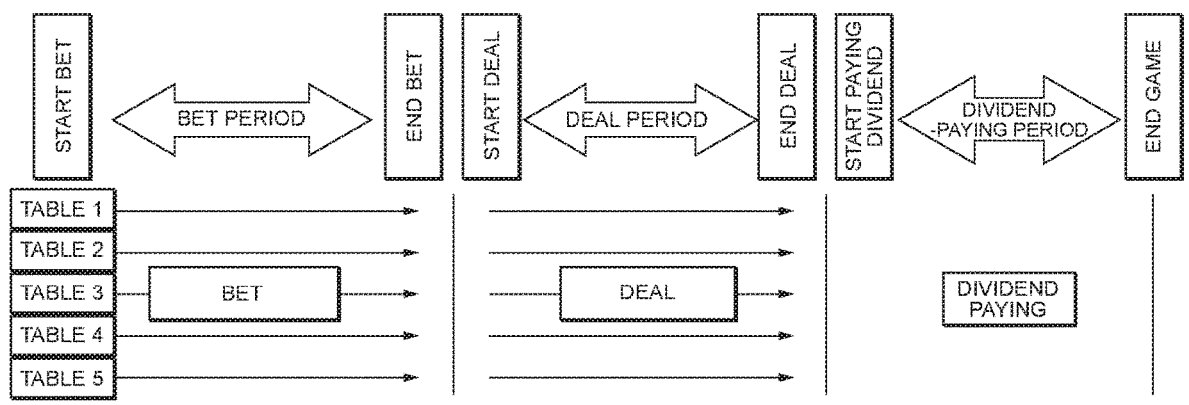
FIG. 5 is a flow diagram of a card game.

FIG. 5 depicts a flow diagram of a card game carried out in the card game system 1000 according to the present embodiment. As depicted in FIG. 5, the present card game is roughly divided into three periods, a "bet period", a "deal period", and a "dividend-paying period" which constitute one round of card game. Start and end timings for these periods are all managed by the master control unit 100. For example, progresses on the tables are synchronized with one another such that the bet period lasts 25 seconds, the deal period lasts 15 seconds, and the dividend-paying period lasts 5 seconds.

A major feature of the card game system 1000 according to the present embodiment is that the master control unit 100 allows a plurality of card games to simultaneously progress, aggregates the results of the games to determine dividends, and record the results of the card games as win and loss histories. The plurality of card games at the plurality of virtual tables is allowed to simultaneously progress to enable generation of interest which fails to be induced by conventional card games.

Specifically, the user seated at any one of the station apparatuses 300 selects any one of the plurality of virtual tables and predicts a win and a loss on the table to make a bet. Even if a card game is played at each of a plurality of the virtual tables, the games are independently carried out, and dividends are discretely paid at the respective tables based on the results of the games.

Bet Period

The "bet period" is a period when the user predicts a win and a loss to make a bet before cards are dealt. A user who is to participate in the card game gets seated at the station apparatus 300 which is out of use. Then, while viewing win and loss histories of the card games displayed on the main display 230, the sub-display 240, and the user's station apparatus 300, the user determines which of the five card games allowed to progress simultaneously is selected for participation. Then, during the bet period, the user predicts a win and a loss in the card game in which the user has participated, and operates the operation unit of each station apparatus 300 to place a bet with chips corresponding to the bet amount based on the prediction of a win and a loss.

During the bet period, each sub-display 240 of the card game system 1000 depicted in FIG. 1 displays a moving image of a dealer assigned to the corresponding card game. Furthermore, in a dealer display area of the main display 230 of the card game system 1000, a game image is displayed which is generated for the card game being executed on any one of the station apparatuses 300. The dealer displayed in the game image can be displayed as a still image or as a moving image. If the dealer is displayed as a moving image, the dealer's action can be changed in response to the user's bet status or action can be expressed which varies according to the round.

Deal Period

The "deal period" is a period which follows the elapse of the bet period and when the user is inhibited from making a bet and the card game is allowed to progress at each station apparatus 300 by dealing cards to the user. In the card game, two or three cards are dealt to each of the banker side and the player side (what is called a "deal"). When two or three cards are dealt to each side is determined for every round by each card game progress unit 102 (described below for FIG. 6) based on random numbers or the like. Then, the numbers in the cards are determined such that the cards the number of which has been determined as described above are dealt.

Dividend-Paying Period

The "dividend-paying period" is a period which follows the elapse of the deal period and when dividends are paid out according to the user's bet status. During the deal period, when the result of each card game is determined, the dividend is determined. Then, at each station apparatus 300, the determined dividend is paid out, and one round of the card game ends.

4. Functional Block Configuration and Operation of the Master Control Unit 100

Now, with reference to FIG. 6, the functional block configuration and operation of the master control unit 100 will be described.

Figure 6:
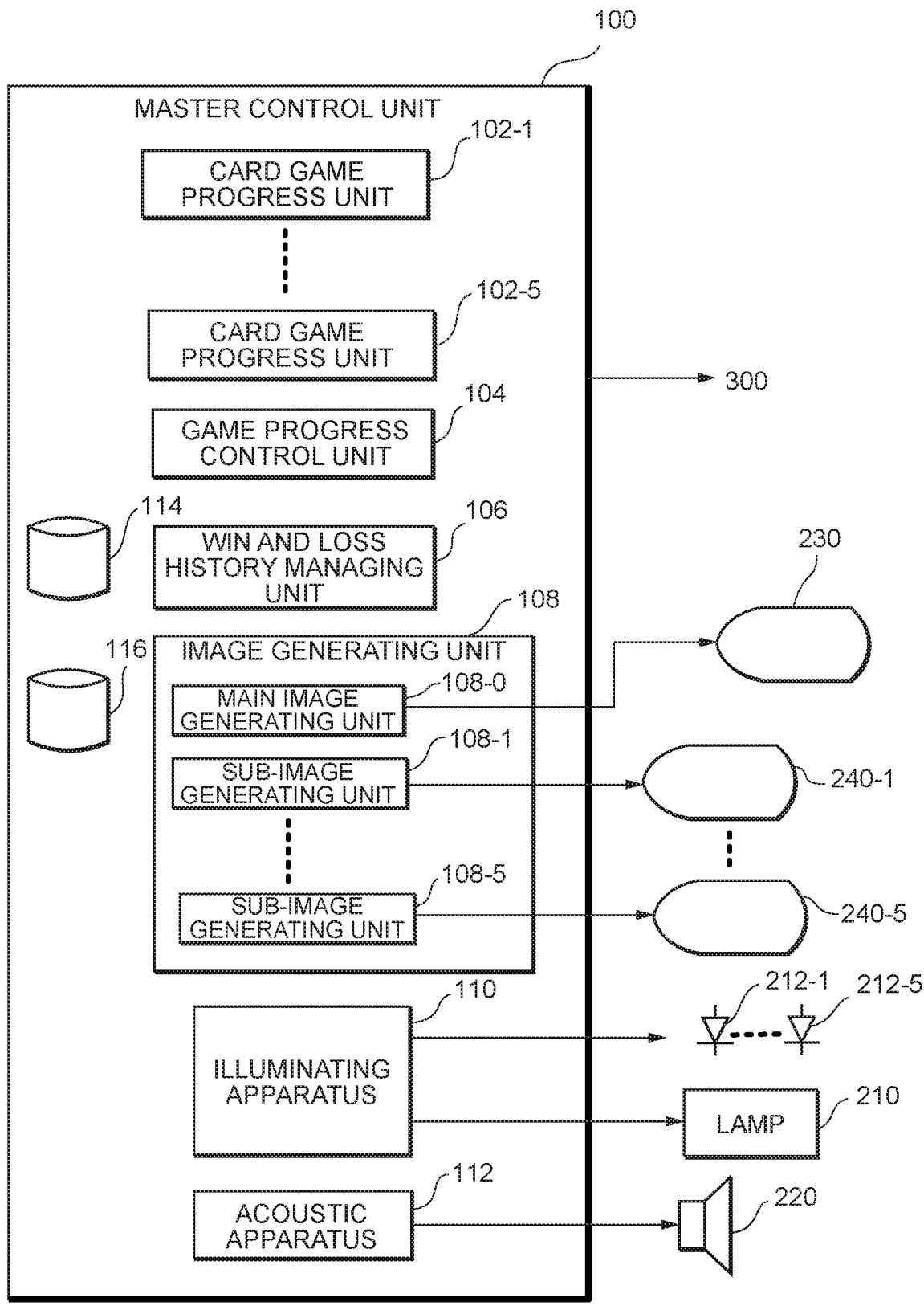
FIG. 6 is a functional block diagram of a master control unit according to the embodiment.

As depicted in FIG. 6, the master control unit 100 functionally comprises the card game progress units 102-1 to 102-5 (all of the game progress units are hereinafter representatively referred to as the card game progress unit 102), a game progress control unit 104, a win and loss history managing unit 106, an image generating unit 108, an illuminating apparatus 110, and an acoustic apparatus 112. The card game progress unit 102 is functionally implemented by the CPU 100*a* executing a program for the game system.

The game progress control unit 104, the win and loss history managing unit 106, and the image generating unit 108 are functionally implemented by the CPU 100*a* executing software programs used to allow the image display method according to the present disclosure to be performed. The illuminating apparatus 110 and the acoustic apparatus 112 are implemented by cooperation between hardware and software. The image generating unit 108 comprises a main image generating unit 108-0 and sub-image generating units 108-1 to 108-5. A win and loss history database 114 is a memory that stores each of the win and loss histories of the games progressing in the respective card game progress units 102. A highlight condition database 116 is a memory which stores one or more highlight conditions described below.

Each of the card game progress units 102 is a functional block which allows one card game to progress. Based on the control of the game progress control unit 104, during the bet period as illustrated in FIG. 3, the card game progress unit 102 accepts bets based on the contents of the users' operations transmitted from the station apparatuses 300 operated by the users having selected the corresponding card games. Then, during the deal period, the card game progress unit 102 holds a lottery and allows the card game corresponding to the result of the lottery to progress. During the dividend-paying period, the card game progress unit 102 calculates the dividends based on the result of the lottery and the users' bet amounts, and transmits instructions for the dividends to the corresponding station apparatuses 300.

The game progress control unit 104 is a functional block that allows a plurality of card games to progress in synchronism. In order to manage timings for periods in the plurality of card games, the game progress control unit 104 operates to instruct each game progress unit 102 to start and end betting, start and end dealing, and start and end paying dividends (end of dividend payment corresponds to end of one game). Since the game progress control unit 104 synchronizes the progress timings for all the card games, the bet period, the deal period, and the dividend-paying period progress synchronously among the plurality of card games. An alternative method comprises allowing the card games to progress in parallel without synchronous control because, when the card games carried out by the card game progress units 102, the game time of each card game varies.

The win and loss history managing unit 106 is a functional block which manages a win and loss history of each of the plurality of card games. The win and loss history managing unit 106 records, for each of the games progressing in synchronism, data indicating whether the banker or the player has won or the game ends in a tie. The win and loss history managing unit 106 allows the corresponding sub-image generating units 108-N (N=1 to 5) to generate images describing win and loss histories in accordance with a predetermined description rule. The win and loss histories are recorded in the win and loss history database 114.

In particular, in Embodiment 1, the win and loss history managing unit 106 is configured to determine whether the win and loss history meets a predetermined highlight condition and to allow further execution of highlighting of a win and loss history image corresponding to a win and loss history determined to meet the highlight condition. The highlight condition is stored in the win and loss history database 114. This will be described in detail.

The main image generating unit 108-0, which is included in the image generating unit 108, is a functional block that generates an image to be displayed on the main display 230. The sub-image generating units 108-1 to 108-5 are functional blocks which generate images used to display images of the card games adapted for the progresses in the corresponding card game progress units 102, on the corresponding sub-displays 240. In particular, the sub-image generating units 108-1 to 108-5 are adapted to generate, under the control of the win and loss history managing unit 106, game images containing win and loss history images representing win and loss histories on the tables. Moreover, the sub-image generating units 108-1 to 108-5 are configured to highlight, under the control of the win and loss history managing unit 106, a win and loss history image corresponding to a win and loss history determined to meet the highlight condition.

The image of the card game generated by the sub-image generating unit 108 is also transmitted to the station apparatus 300 having selected the card game and is displayed on the display apparatus 350 of the station apparatus 300. Furthermore, the image of the card game generated by each sub-image generating unit 108 can also be allowed to be selectively displayed on the main display 230.

The image generated by the image generating unit 108 is generated based on image information stored in the image information database 116.

The illuminating apparatus 110 can output an illumination control signal to the lamps 210 to allow the lamps 210 to perform renditions based on illuminations associated with the card games. For example, the lamps 210 can be turned on and off and the color of light emitted from the lamps 210 can be varied. Furthermore, the illuminating apparatus 110 controls, for example, blinking of the light emitting diodes 212-1 to 212-5. In this case, a plurality of tables on which bets are being accepted is formed into one group or a plurality of tables on which game results have been determined is grouped, and lighting is controlled so as to distinguish the groups from one another. Then, the user can easily and effectively determine the statuses of the tables.

The acoustic apparatus 112 outputs acoustic control signals to the speakers 220 to enable renditions to be performed based on sounds associated with the card games. For example, the acoustic apparatus 112 can generate BGM or a sound effect or generate a human voice that sounds like a dealer using a technique such as voice synthesis.

In the above-described operations from (3. Flow of a Card Game) to (4. Functional Block Configuration and Operation of the Master Control Unit 100), the plurality of card games progress at the same time, and the bet period, the deal period, and the dividend-paying period are each a fixed period. However, the present disclosure is not limited to this.

For example, the time from the start to end of dealing varies with the game depending on, for example, the type of dealt cards. Thus, in view of efficient progress of the games, at each table, it is important for efficient progress of the card games to shift to the next card game at the timing when a series of games ends.

In this case, the game progress control unit 104 of the master control unit 100 allows the card games carried out at the respective card game progress units 102 to progress in parallel without synchronous control. The user can participate in the game by depressing a table select button BSt, then selecting the table at which the user can make a bet, and placing a bet, while viewing the progress status of each table. Furthermore, the user may be allowed to finish placing a bet during the bet period of one card game and then select another table before placing a bet during the bet period of the selected another table.

At this time, the status of the game for which the user has already placed a bet can be checked on the main display 230 if the main display 230 depicts the game image of the table at which the user has already placed a bet. Furthermore, the status can be checked on any of the sub-displays 240 on which the game images at the respective tables are displayed.

Figure 7:
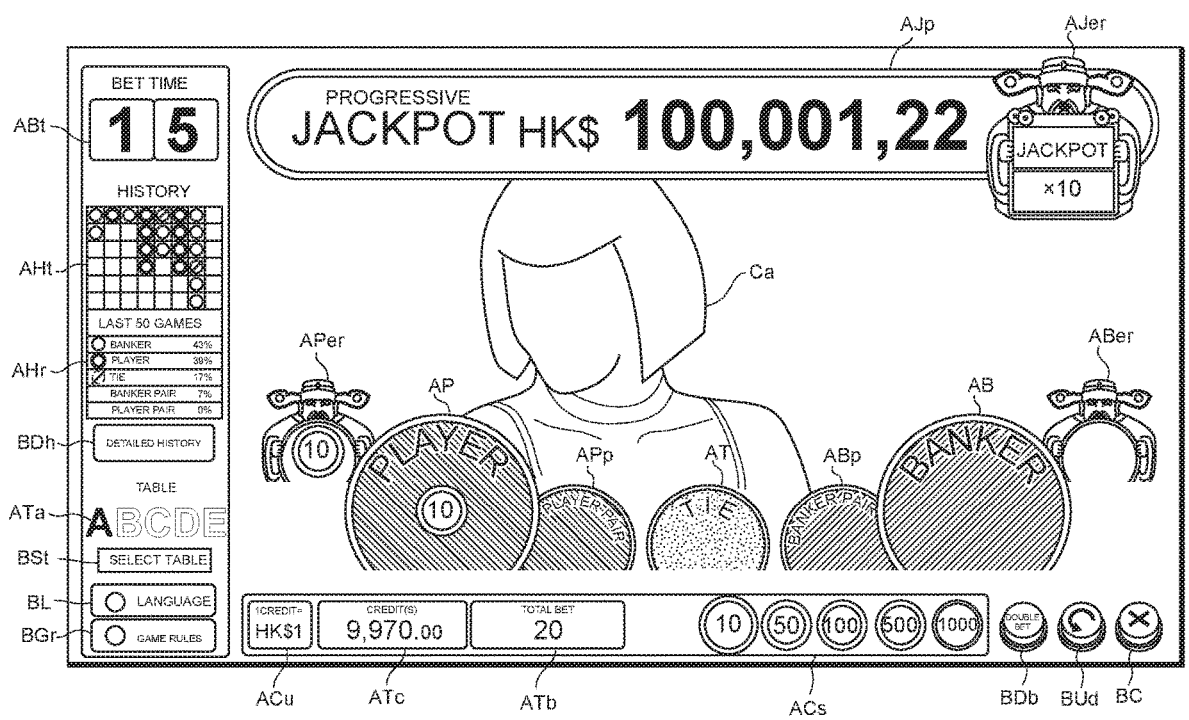
FIG. 7 a diagram of an example of image display of a bet period provided on a display apparatus of the station apparatus according to the embodiment.

5. Description of Image Display Examples and Ruled Lines in the Present Embodiment Now, with reference to FIG. 7 and FIG. 8, specific image display examples and ruled lines in the present embodiment will be described. FIG. 7 is an image display example for betting during the bet period displayed on the display apparatus of the station apparatus according to the present embodiment, and illustrates a case where the card game corresponding to a "table A" has been selected.

During the bet period, such an image as depicted in FIG. 7 is displayed on the display apparatus 350 of the station apparatus 300. As depicted in FIG. 7, in the image during the bet period, a large character image Ca of a dealer which is a symbol of the card game is displayed in the center. On the right of an area below the character image Ca, a banker bet area AB, a banker pair bet area ABp, an exciting award banker bet area ABer are displayed. On the left of the area below the character image Ca, a player bet area AP, a player pair bet area APp, and an exciting award player bet area APer are displayed. In the center of the area below the character image Ca, a tie bet area AT is displayed.

Above the image, a progressive jackpot display area AJp, and a jackpot ratio display area AJer are displayed.

In a stage below the image, a cancel button BC, an undo button BUd, a double bet button BDb, a bet chip select area ACs, a total bet amount display area ATb, a credit amount display area ATc, and a conversion rate display area ACu are displayed from right to left.

To the left of the image, the following are displayed: a bet remaining time display area ABt, a win and loss history display area AHt, an icon appearance rate display area AHr, an enlarged history display select button BDh, a select table display area ATa, a table select button BSt, a language select button BL, and a game rule display button BGr.

For these images, the highlight condition in the present embodiment corresponds to a pattern of an icon appearing in "ruled lines" displayed in the win and loss history display area AHt. The "ruled lines" correspond to a score board in which a win and loss history of baccarat is recorded in accordance with a special expression rule. The ruled lines displayed in the win and loss history display area AHt are simplified, and enlarged win and loss history display can also be provided.

Several description methods are available for the ruled lines. The following description is based on a popular recording scheme for the win and loss history referred to as Big Road.

Now, the Big Road recording scheme will be described. The ruled lines depicted in the win and loss history display area AHt in FIG. 7 is an example of ruled lines used for the Big Road recording scheme. The Big Road comprises a grid with a predetermined number of rows (in the Big Road, six rows). In the Big Road recording scheme, the results of one card game are recorded in each cell of the grid. The recording starts at the upper left cell. In the relevant cell, a red ring (in the example in FIG. 7, a thin-ring icon) is marked if the banker wins, a blue ring (in the example in FIG. 7, a thick-ring icon) is marked if the player wins, and a slash is marked if the game ends in a tie.

If the same side wins the subsequent game (if the banker wins the last game and also wins the current game or if the player wins the last game and also wins the current game), a ring in the same color is marked in a cell immediately below the last cell marked. When the same side consecutively wins and the bottom row of the ruled lines is reached, if the same side wins the subsequent game again, a cell to the immediate right of the lowermost row is filled.

If a different side wins the subsequent game (if the banker wins the last game and the player wins the current game or if the player wins the last game and the banker wins the current game), a ring in a different color is marked in the uppermost cell in a column to the immediate right of the last cell marked.

If the subsequent game ends in a tie, a slash indicative of a tie is marked, and the result of the subsequent card game is marked in the uppermost cell in a column to the immediate right.

Figure 8:
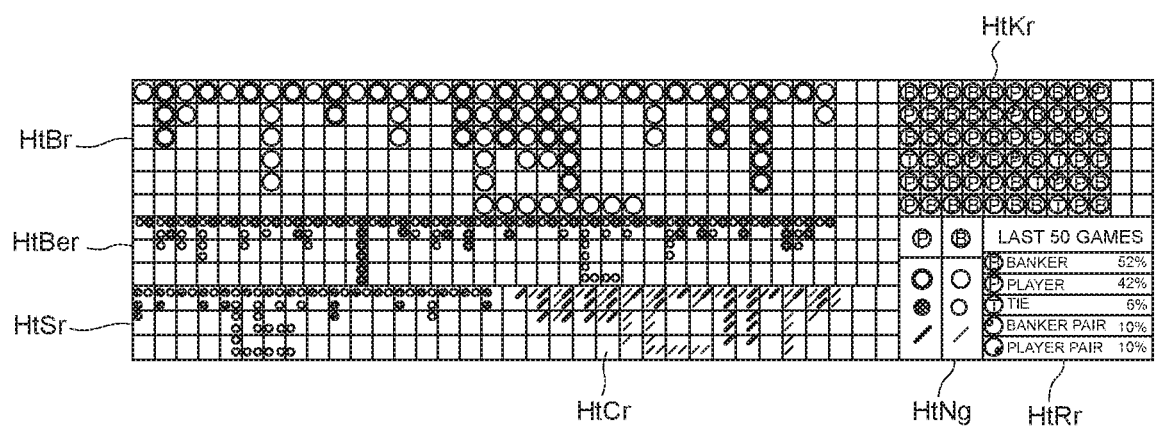
FIG. 8 is a diagram of an example of image display of an enlarged win and loss history provided on a display apparatus of the station apparatus according to the embodiment.

The Big Road is not the only "ruled lines", but different recording schemes are available. FIG. 8 is an image display example of an enlarged win and loss history displayed on the display apparatus of the station apparatus. When the user selects an enlarged win and loss history display select button BDh while viewing the image of the bet period depicted in FIG. 7, the enlarged win and loss history depicted in FIG. 8 is displayed.

As depicted in FIG. 8, the enlarged win and loss history display is a set of ruled lines used to record the win and loss history in accordance with a different expression rule. The enlarged win and loss history display comprises a Big Road history display HtBr, a Big Eye Road history display HtBer, a Small Road history display HtSr, a Cockroach Road history display HtCr, a Bread Road history display HtKr, a display symbol description HtNg, and a win and loss statistics display HtRr.

The Big Road history display HtBr has been described for FIG. 7. The Big Eye Road history display HtBer is an expression method in which recording is based on a comparison between the latest win and loss with the win and loss in the preceding column. The a Small Road history display HtSr is an expression method in which recording is based on a comparison between the latest win and loss with the win and loss in a column two columns before. The a Cockroach Road history display HtCr is an expression method in which recording is based on a comparison between the latest win and loss with the win and loss in a column three columns before. The Bread Road history display HtKr is an expression method in which a win and a loss are sequentially recorded in six cells in the vertical direction without the need to change the column depending on the result of the game and in which, once the six cells in the vertical direction are filled, recording shifts to six cells in the vertical direction to the immediate right. Here, the highlight described below in the present embodiment can be applied to any history display by being changed as needed.

6. Highlight in the Present Embodiment

The present embodiment is characterized by determining whether the win and loss history of each card game meets a predetermined highlight condition and allowing highlighting to be executed on the win and loss history image corresponding to the win and loss history determined to meet the particular highlight condition.

Here, the "highlight condition" refers to a pattern which appears when the win and loss history is displayed in accordance with a given display rule. In the present embodiment, when the win and loss history display matches a preset pattern in form, the win and loss history is determined to meet the highlight condition, and preset highlighting is performed.

For example, the highlight condition can be set to be a predetermined pattern of icons appearing on the ruled lines in which the win and loss history is recorded. Specifically, when, in accordance with the expression rule for the ruled lines, the win and loss history is sequentially recorded using a red-ring icon indicative of the banker's win, a blue-ring icon indicative of the player's win, and a slash icon indicative of a tie, if a pattern comprising a combination of red rings and blue rings appearing on the ruled lines matches a pattern according to the preset highlight condition, the win and loss history is determined to meet the highlight condition and the predetermined highlighting is performed.

The following is the reason why the highlighting is performed even though the probability of the baker's win is substantially the same as the probability of the player's win. This is because human beings have the property of being likely to concentrate their attention on a particular arrangement pattern of icons when the win and loss history image is expressed like the ruled lines. When a pattern similar to a previously appearing pattern starts to appear, the human brain tends to expect that the result of the current game will be similar to the past pattern. As expressed by the phrase "acting superstitious for good luck", the human brain expects that a past event will occur again without any convincing evidence. Thus, in the present embodiment, a particular pattern of icon arrangement which is likely to be expected by human beings is set to be the highlight condition. If the win and loss history meets the highlight condition, the highlight is used. Thus, even if a plurality of card games is synchronously in progress, the user can be effectively notified of the appearance of the particular pattern.

The pattern set to be the "highlight condition" is a particular arrangement comprising a combination of icons, and any pattern may be used so long as the pattern makes human beings expect that the same arrangement will appear.

For example, the following pattern may be set: the same side consecutively wins, the win and loss history display of the icons reaches the lowermost row, and the same side further wins, with the icons displayed to the immediately right of the lowermost row.

Furthermore, the "highlight" may be applied to the "ruled lines", which correspond to the win and loss history display or to an element outside the "ruled lines". The aspect thereof may be an aspect in which a display image is added or changed or an aspect in which an element other than the display image is utilized. Specifically, as non-limited examples, the following aspects may be carried out independently or in combination.

Highlight 1

A highlight image can be added to the corresponding win and loss history image for predetermined highlighting. The highlight image is, for example, a particular image, for example, an image representing a "flame", added to the periphery of the ruled lines.

Highlight 2

The display mode of the icons can be changed which is displayed at a position in the corresponding win and loss history image where the image meets the highlight condition. With the pattern that meets the highlight condition being highlighted, the aspect enables the user's attention to be directly drawn to the pattern.

Highlight 2-1

Specifically, the icons can be converted into moving images. In the display image of the ruled lines, the red rings and the blue rings can be displayed so as to be apparently moving by varying the display positions of red rings and blue rings over time. For example, the ring icons can be displayed so as to be apparently vibrating by enlarging and contracting the ring icons.

Highlight 2-2

Furthermore, the icons can be converted into three-dimensional images. In the display image of the ruled lines, the red rings and the blue rings can be displayed as three-dimensional shaded images. Furthermore, the highlight 2-2 can be combined with the above-described highlight 2-1 such that, in the display image of the ruled lines, the red rings and the blue rings can be displayed so as to be apparently moving by varying the display positions of red rings and blue rings over time. For example, the ring icons can be displayed such that the display positions of the three-dimensionally displayed ring icons are consecutively varied so as to rotate the ring icons.

Highlight 2-3

Moreover, an area containing the icons can be animated. Display of the animation enables appeal strongly of the appearance of a pattern meeting the highlight condition.

Highlight 3

When a character image is generated for each of the plurality of card games displayed in the win and loss history in juxtaposition, the display mode of any displayed character image can be changed by arranging corresponding win and loss history images. For example, appearance of a special pattern can be suggested by changing, if character images of dealers characteristic of the respective card games are displayed, the character image of any dealer into a moving image or changing the facial expression or posture of the character image.

The highlighting can be achieved not only by changing the image but also by applying any other physical element to the image. For example, the following are possible.

Highlight 4

When the win and loss history image is determined to meet the highlight condition, the illuminating apparatus (in the embodiment, reference numeral 110) is driven. For example, when the win and loss history image matches a special pattern, the light emitting diode 212 arranged around the sub-display 240 displaying the image of the corresponding card game can be lighted or blinked. Furthermore, an illumination control signal is delivered to the lamps 210 to light or blink the lamps 210 to enable the user's attention to be invited to notify the user that the special pattern has appeared in any of the card games.

Highlight 5

When the win and loss history image is determined to meet the highlight condition, the acoustic apparatus (in the embodiment, reference numeral 112) is driven. For example, when the win and loss history image is determined to meet the highlight condition, the speakers 220 are allowed to generate a predetermined sound or voice to enable the user's attention to be invited to notify the user that the special pattern has appeared in any of the card games.

An illumination rendition using the lamps 210 unassociated with a particular card game and an acoustic rendition using the speakers 220 fail to immediately indicate which of the card games involves a win and loss history meeting the highlight condition even when light or sound is generated. However, the use of the highlight 5 with any of the highlights 1 to 3 enables the user to be more effectively notified of the highlight condition.

The special pattern serving as the highlight condition can be set not only for the Big Road history display, which is frequently used, but also for other types of history display involving recording based on different expression methods. That is, the highlighting in the present disclosure can be performed by setting the highlight condition that win and loss history display other than the Big Road history display which is based on the above-described expression method matches a particular pattern.

7. Operation Sequence for the Highlighting Method in the Present Method

Figure 9:
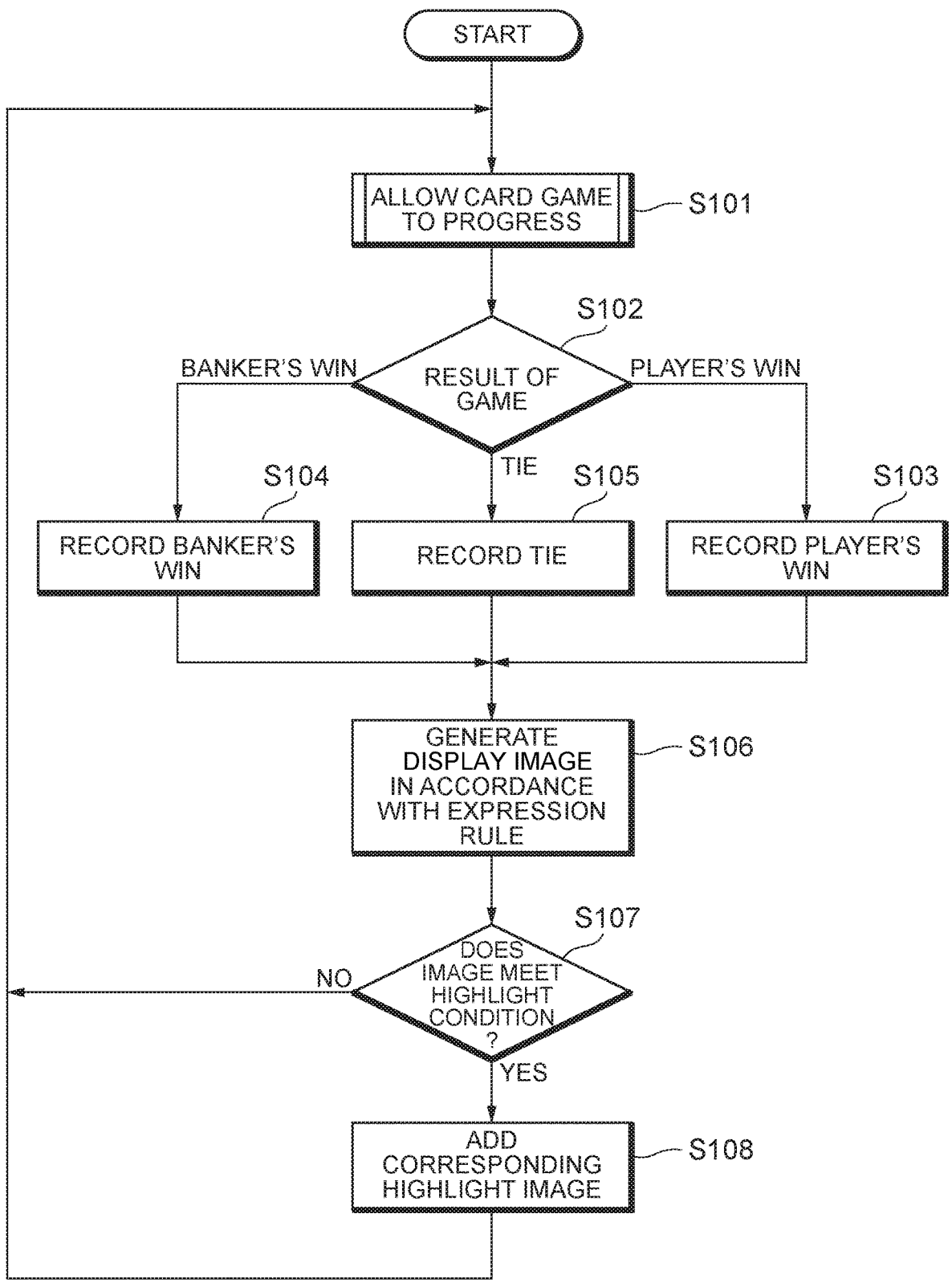
FIG. 9 is a flowchart of an image display method according to the embodiment.

FIG. 9 illustrates a flowchart of an image generating method according to the present embodiment. The flowchart illustrated in FIG. 9 is executed under the control of the master control unit 100, which is a functional block that controls the progress of the card game.

The flowchart illustrated in FIG. 9 is executed once for one round of the card game. In step S101, the plurality of card game progress units 102 allows the card games to progress under the control of the game progress control unit 104.

The process shifts to step S102, and when the win and the loss in each card game are determined, the master control unit 100 determines whether the player or the banker has won or the game has ended in a tie.

If the player has won, the process shifts to step S103, the win and loss history managing unit 106 records the player's win in the card game in the win and loss history database 114. If the banker has won, the process shifts to step S104, and the win and loss history managing unit 106 records the banker's win in the card game in the win and loss history database 114. If the game ends in a tie, the process shifts to step S105, and the win and loss history managing unit 106 records the tie in the card game in the win and loss history database 114.

In step S106, the win and loss history managing unit 106 generates an display image of the ruled lines in accordance with a predetermined expression rule based on the win and loss history recorded in the win and loss history database 114.

In step 107, the win and loss history managing unit 106 determines whether or not the display image of the ruled lines meets a preset highlight condition.

At the table for which the display image of the ruled lines meets the preset highlight condition (S107: YES), the process shifts to step S108, and the win and loss history managing unit 106 adds a predetermined highlight to the image of the corresponding one of the card games on the sub-image generating units 108-1 to 108-5, and then waits for the start of the next card game.

At the table for which the display image of the ruled lines fails to meet the preset highlight condition (S107: NO), the win and loss history managing unit 106 waits for the start of the next card game without providing any highlight (S101).

As described above, the image display method in the present disclosure is achieved by setting the highlight condition and the aspect of the highlight and executing any aspect of highlighting when the highlight condition is met.

8. Highlight in Embodiment 1

Now, a highlight in Embodiment 1 will be described with reference to enlarged history display provided on the display apparatus of the station apparatus in FIG. 10A to 10C. Embodiment 1 is characterized in that the highlight condition is the appearance of an L-shaped pattern and that, as a highlight, highlighting of the ruled lines is applied.

Figure 10A:
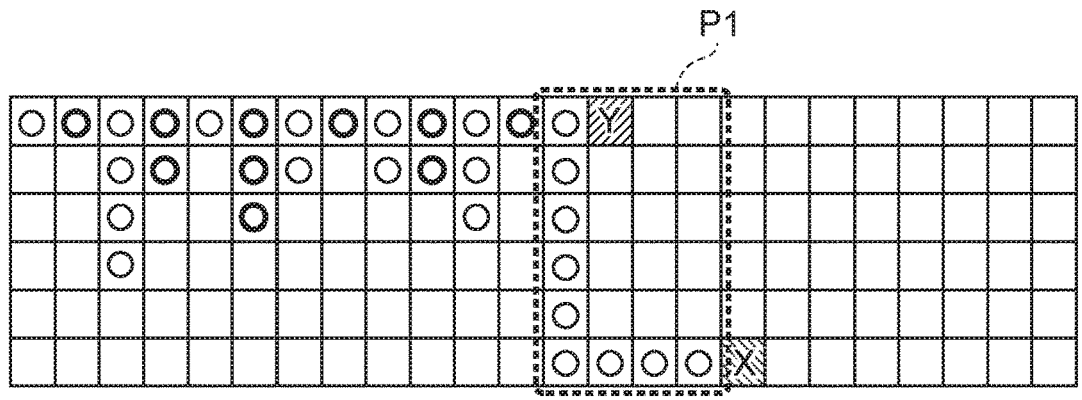
FIG. 10A is a diagram of an example of image display illustrating a highlight condition according to Embodiment 1.

FIG. 10A depicts a pattern serving as a highlight condition in Embodiment 1. As depicted in FIG. 10A, an area P1 enclosed by a dashed line is a pattern serving as the highlight condition. In this pattern example; a pattern appears in which the banker consecutively wins such that red-ring (thin-ring) icons are contiguously arranged in an L form. Once this win and loss history is formed, a red-ring (thin-ring) icon is marked in a cell "X" if the banker wins in the next card game, and a blue-ring (thick-ring) icon is marked in a cell "Y" if the player wins in the next card game. However, upon noticing the appearance of this special pattern, the user tends to strongly expect that the banker will win again, with the red-ring icon marked in the cell "X". Thus, in the present embodiment, at the opportunity of appearance of the special pattern, highlighting is performed to indicate that the special pattern has appeared in this card game such that even users not participating in the card game can recognize the appearance. This enables more users' gambling spirits to be fueled to entice the users to participate in the card game.

Figure 10B:
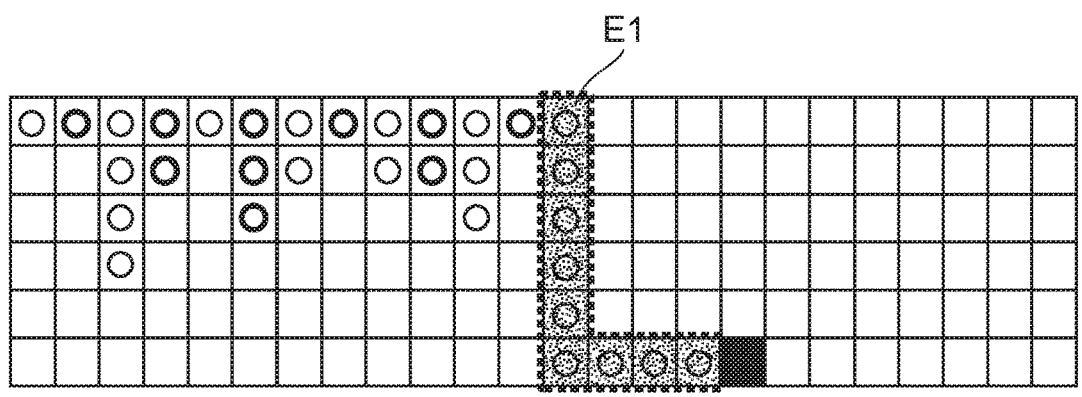
FIG. 10B is a diagram of an example of image display (1) of highlighting of a win and loss history display according to Embodiment 1.

The image display example of a highlight in FIG. 10B is an embodiment in which the above-described highlight 2 is applied as a highlight if the appearance of the L-shaped pattern is used as a highlight condition. The color (background color) of the cells in a group of icons E1 arranged in L form is changed to visually emphasize that the special pattern has appeared near the cell with the color thereof changed.

Figure 10C:
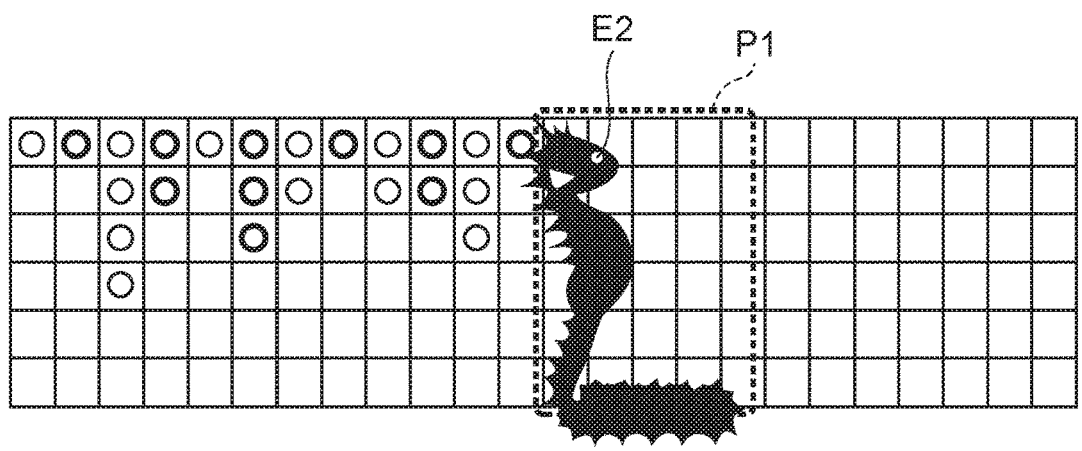
FIG. 10C is a diagram of an example of image display (2) of highlighting of the win and loss history display according to Embodiment 1.

The image display example of a highlight in FIG. 10C is an embodiment in which the above-described highlight 2-3 is applied as a highlight if the appearance of the L-shaped pattern is used as a highlight condition. An animated image E2 of a "dragon" is displayed in an area P1 of the icons arranged in L form to very effectively visually emphasize that the special pattern has appeared in the area where the animated image is displayed.

9. Highlight in Embodiment 2

Now, a highlight in Embodiment 2 will be described with reference to FIGS. 11 to 14. Embodiment 2 is characterized in that appearance of an I-shaped pattern is a highlight condition and in that a highlight is applied to an element outside the ruled lines as a highlight.

Figure 11:
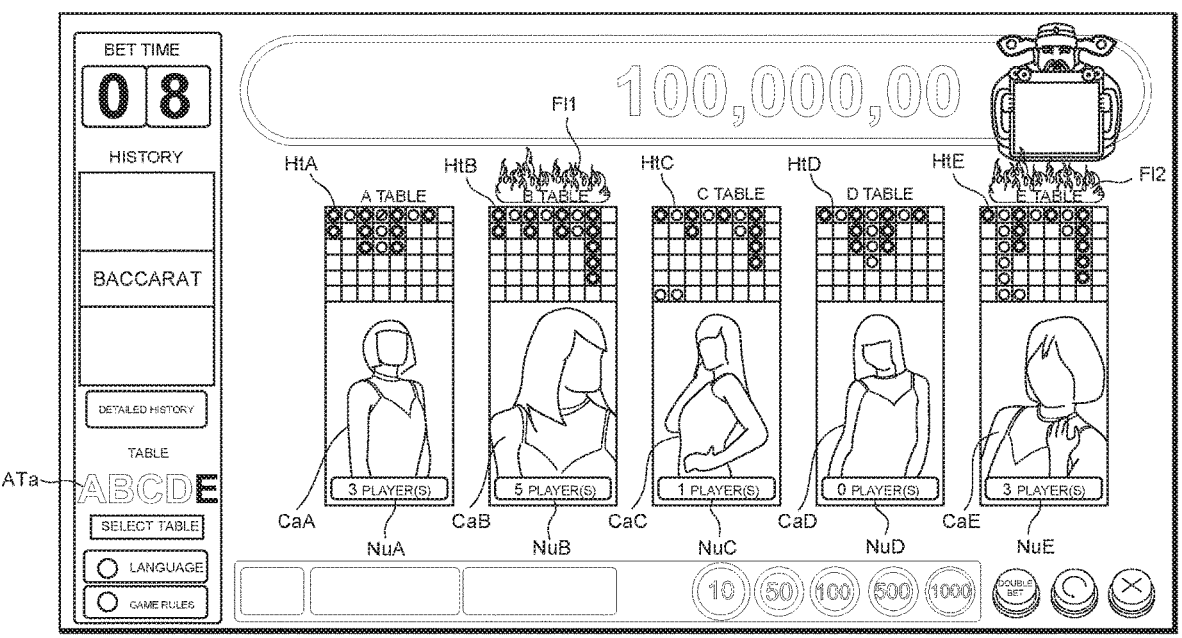
FIG. 11 is a diagram of an example of image display of a highlight on a game selection screen displayed on a display apparatus of a station apparatus according to Embodiment 2.

FIG. 11 depicts an image display example of a highlight in a screen for game selection displayed on the display apparatus of the station apparatus according to Embodiment 2. During the bet period, in such an image as depicted in FIG. 7 which is provided on a display apparatus 350 of the station apparatus 300, when the user selects the table select button BSt, such a table (card game) select screen as depicted in FIG. 11 is displayed.

In the table select screen depicted in FIG. 11, a combination of a character image area Ca, a user number display area Nu indicative of the number of users having selected the table, and a simplified win and loss history display area Ht for the table (card game) is displayed for each table (card game). In this table select screen, the highlight in the present disclosure is applied.

In the select screen, the highlight condition is an I-shaped pattern in which six cells arranged on the ruled lines in tandem are all filled with icons. In the win and loss history display areas HtB and HtE for the tables B and E, included in the plurality of tables, the I-shaped pattern meeting the condition appears. Thus, the master control unit 100 displays a background image expressing a flame at an upper end indicating a table name, as a first highlight. This corresponds to the above-described highlight 1. This processing allows a flame image F11 to be displayed near the ruled lines on the table B, while allowing a flame image F12 to be displayed near the ruled lines on the table E. This emphasizes that the win and loss histories at these tables match the special pattern.

Furthermore, the master control unit 100 changes the display mode of the character image in the character image area Ca as a second highlight. This corresponds to the above-described highlight 3. This processing allows character images CaB and CaE to be displayed as moving images on the table B and the table E. Compared to still image display of character images CaA, CaC, CaD at the other tables A, C, D, the provided highlight display is very noticeable.

Figure 12:
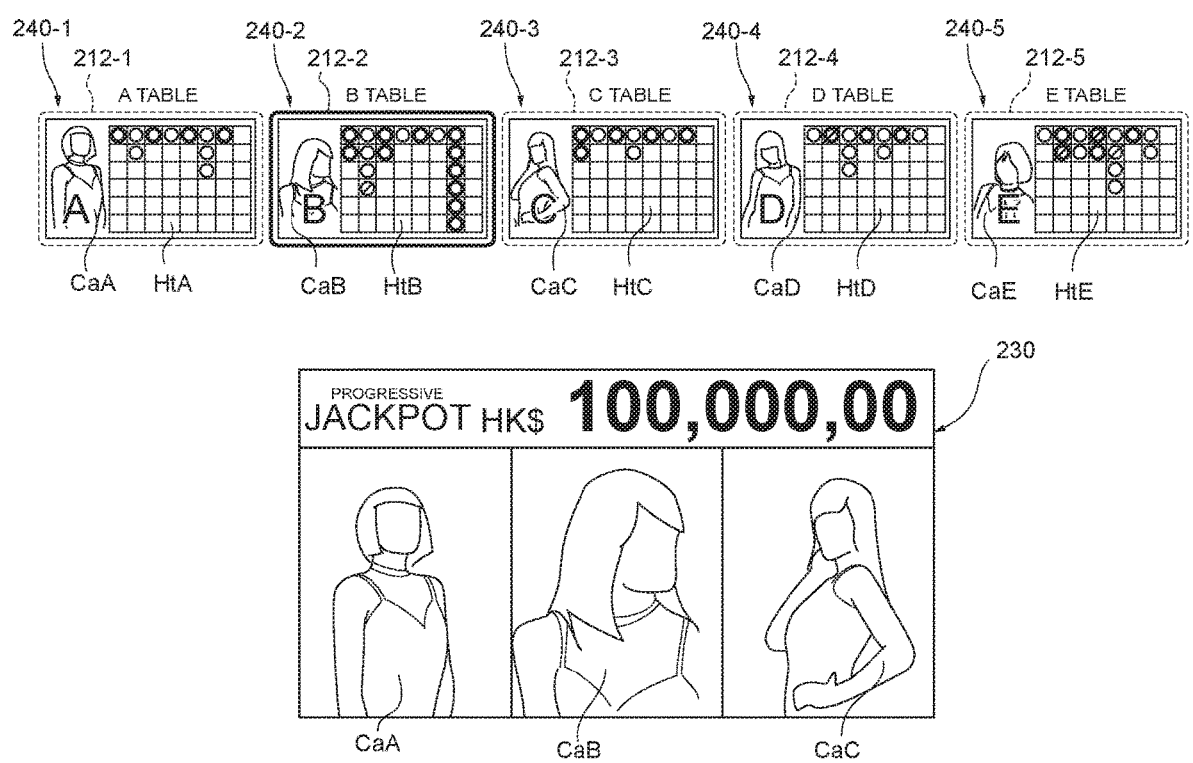
FIG. 12 is a diagram of an example of image display of a highlight on a main display and a sub-display during a standby period according to Embodiment 2.

FIG. 12 depicts an image display example of a highlight on the main display and the sub-displays during a standby period according to Embodiment 1.

An idle period may occur during which the user makes no bet at the station apparatus 300. During such an idle period, the master control unit 100 allows each of the main display 230 and the sub-displays 240 to display an image based on the win and loss history of the last played card game.

As depicted in FIG. 12, the sub-displays 240 display the last win and loss histories HtA to HtE on the tables A to E and the character images CaA to CaE for the respective tables. The main display 230 displays an image of a current jackpot amount, and the character image CaB for the table B and two other character images between which the character image CaB is sandwiched.

The highlight condition for the idle period is an I-shaped pattern in which six cells arranged on the ruled lines in tandem are all filled with icons. In the win and loss history display area HtB on the table B, included in the plurality of tables, the I-shaped pattern appears which meets the highlight condition. Then, the master control unit 100 drives the illuminating apparatus 110 to allow the illuminating apparatus 110 to light or blink the light emitting diode 212-2 arranged to surround the sub-display 240-2 as a first highlight. This corresponds to the above-described highlight 4.

Furthermore, the master control unit 100 changes the character image CaB for the table meeting the highlight condition into a moving image. In addition, the master control unit 100 drives the acoustic apparatus 112 to allow the acoustic apparatus 112 to generate a sound which matches the motion of the character image. This corresponds to the above-described highlight 3 and highlight 5.

The above-described processing allows moving imaging, an illumination rendition, and an acoustic rendition to be performed to highlight the table B compared to the other tables.

10. Highlight in Embodiment 3

Figure 13:
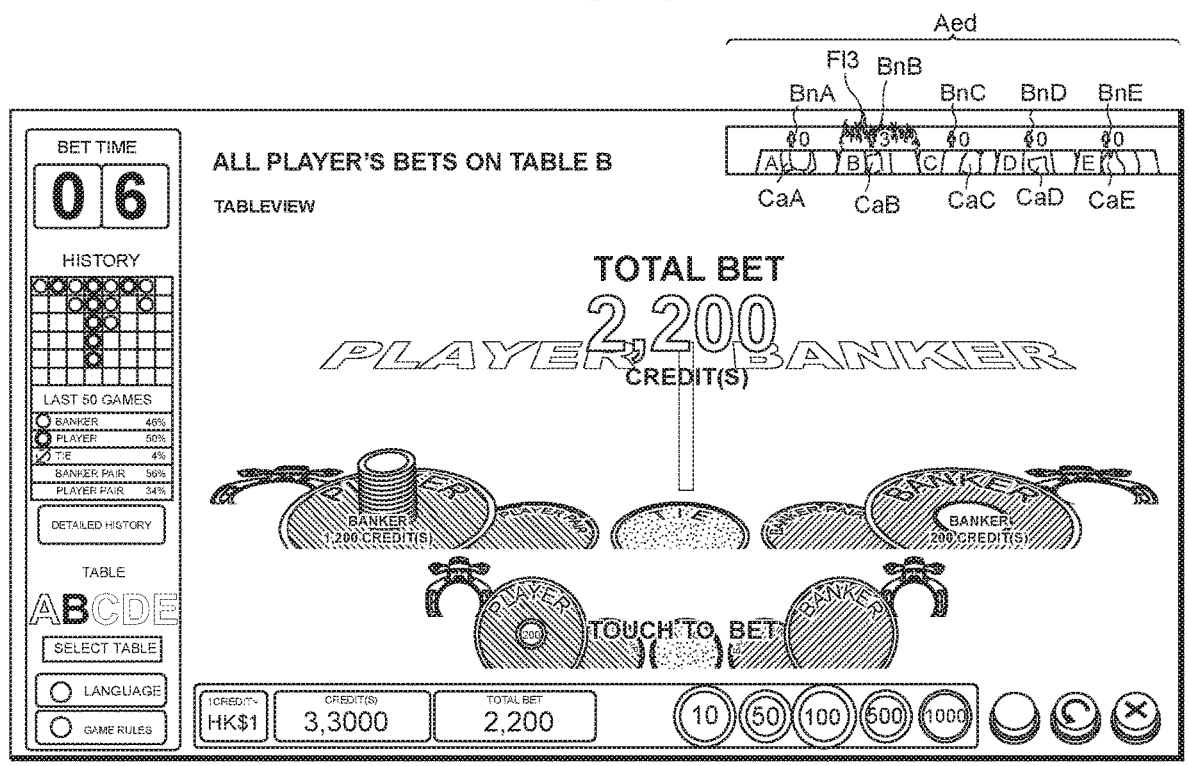
FIG. 13 is a diagram of an example of image display of a highlight on a game selection screen in a table view displayed on a display apparatus of a station apparatus according to Embodiment 3.

FIG. 13 depicts an image display example of a highlight on a game select screen in a table view displayed on the display apparatus of the station apparatus according to Embodiment 3.

During the bet period, in such an image as depicted in FIG. 7 which is provided on the display apparatus 350 of the station apparatus 300, a table view screen as depicted in FIG. 13 is displayed when the user operates an operation button provided outside the display apparatus 350 and not depicted in the drawings. In the table view screen depicted in FIG. 13, a table screen image is provided which displays the bet status of the table selected by the user as observed three-dimensionally from an obliquely upper side. In an upper right portion of the table view screen, a bet status display area Aed for all the tables (card games) is displayed. The bet status display area Aed depicts the character image area Ca and the number of users Bn who have selected this table. The highlight in the present disclosure is applied to the bet status display area Aed.

In Embodiment 3, the highlight condition is other than the ruled lines for the win and loss history display. Specifically, the highlight condition is that the number of users having selected a table and actually placed a bet at the table has reached a predetermined value (in this case, three). Only the table B, included in the plurality of tables A to E, involves three users having placed a bet and meets the highlight condition. Thus, the master control unit 100 allows a background image expressing a flame to be displayed in the upper portion of the character image CaB for the table as a highlight. This corresponds to the above-described highlight 1. This processing allows a flame image F13 to be displayed on the table B, emphasizing that many users have placed a bet at the table, that is, the table is popular.

In the above description, the highlight condition is the number of users having placed a bet at the table. However, the present disclosure is not limited to this, and the highlighting may be achieved using the number of users having selected the table. In this case, much attention paid to the table is indicated when many users, who have not actually placed a bet, select the table and watch the progress of the game on the table as clients. Thus, providing a highlight indicating popularity and a degree serves as useful information for the other users.

11. Highlight Condition in Embodiment 4

Figure 14:
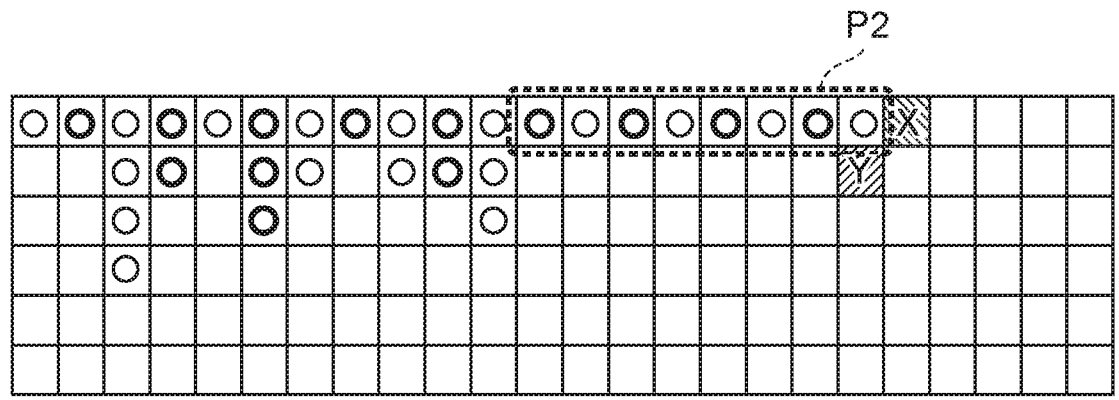
FIG. 14 is a diagram of an example of image display illustrating a highlight condition for a win and loss history according to Embodiment 4.

FIG. 14 depicts an image display example illustrating a highlight condition for win and loss histories according to Embodiment 4. Embodiment 4 relates to a highlight condition different from the highlight condition in the above-described embodiments.

An area P2 enclosed by a dashed line in FIG. 14 is a special pattern corresponding to the highlight condition. A red ring (thin ring) indicative of the banker's win and a blue ring (thick ring) indicative of the player's win are alternately repeated (in this case, four times). In such a special pattern, the winning side varies with a given period, making the user expect that the result of the next card game will follow this special pattern. In FIG. 14, the banker has won the last game. If the player wins the next game, the corresponding icon is placed in the cell "X", and if the banker wins the next game, the corresponding icon is placed in the cell "Y". However, the appearance of this special repeat pattern makes the user believe that the player will win the next game, with the player icon placed in the cell "X".

Thus, the master control unit 100 sets a highlight condition corresponding to the special pattern with the side alternately changing, and performs the desired highlighting when the special pattern appears.

The highlight may be a flame, a dynamic animated image of the icon, or a moving image of the dealer image displayed in the area P2 corresponding to the special pattern, blinking of the light emitting LED 212 around the corresponding sub-display 240, an acoustic sound effect, or the like. One of these highlights or a combination of a plurality of the highlights provides a highlight which makes a difference from the normal state. This allows the user to recognize that there are various win patterns other than the pattern known by the user and to select from a wide range of win patterns in placing a bet.

12. Highlight Condition in Embodiment 5

Figure 15:
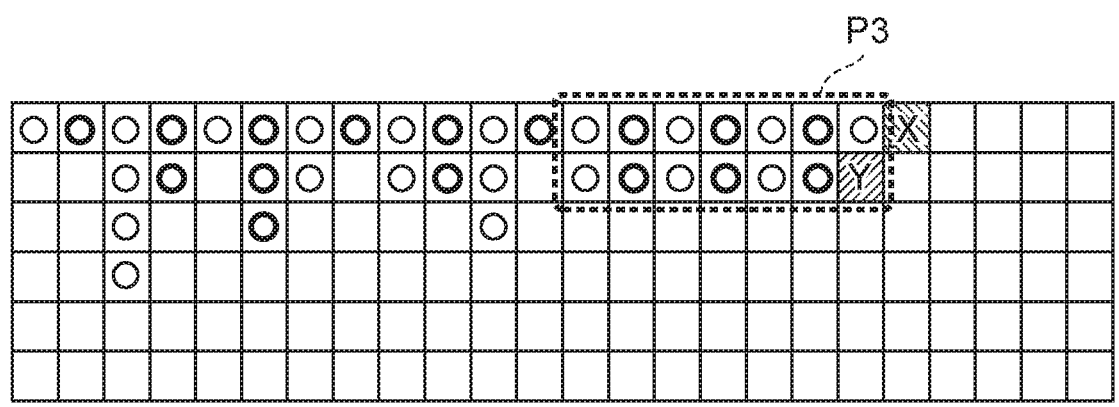
FIG. 15 is a diagram of an example of image display illustrating a highlight condition for a win and loss history according to Embodiment 5.

FIG. 15 depicts an image display example illustrating a highlight condition for win and loss histories according to Embodiment 5. Embodiment 5 relates to a highlight condition different from the highlight condition in the above-described embodiments.

An area P3 enclosed by a dashed line in FIG. 15 is a special pattern corresponding to the highlight condition. A set of two red rings (thin rings) each indicative of the banker's win and a set of two blue rings (thick rings) each indicative of the player's win are alternately repeated a predetermined number of times (in this case, six times). In such a special pattern, the side changes with a period in accordance with a given order, making the user expect that the result of the next card game will follow this special pattern. In FIG. 15, the banker has won the last game. If the player wins the next game, the corresponding icon is placed in the cell "X", and if the banker wins the next game, the corresponding icon is placed in the cell "Y". However, the appearance of this special repeat pattern makes the user believe that the player will win the next game again, with the player icon placed in the cell "X".

Thus, the master control unit 100 sets a highlight condition corresponding to the special pattern in which the side changes such that a set of two icons alternates with another set of two icons, and performs the desired highlighting when the special pattern appears. Consequently, even a pattern which may be missed when many games are available is highlighted, the user can clearly recognize the special pattern and uses the special pattern as a reference for betting.

13. Highlight Condition in Embodiment 6

Figure 16:
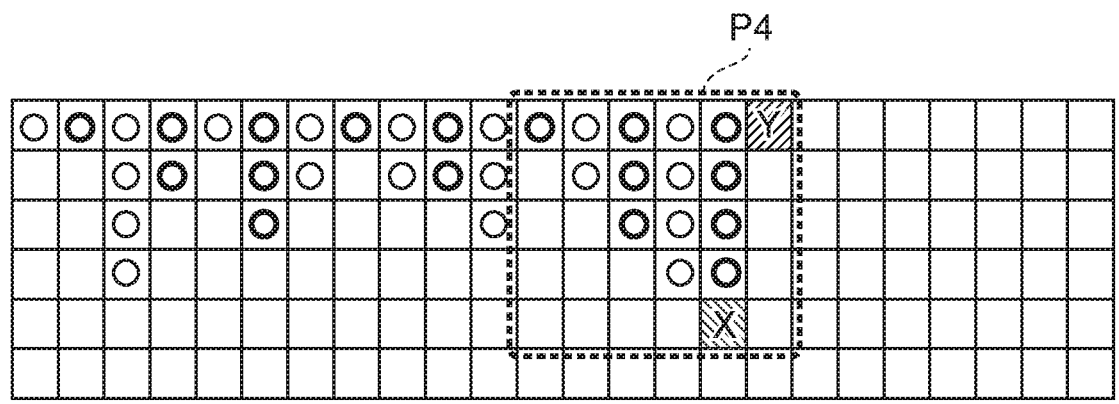
FIG. 16 is a diagram of an example of image display illustrating a highlight condition for a win and loss history according to Embodiment 6.

FIG. 16 depicts an image display example illustrating a highlight condition for win and loss histories according to Embodiment 6. Embodiment 6 relates to a highlight condition different from the highlight condition in the above-described embodiments.

An area P4 enclosed by a dashed line in FIG. 16 is a special pattern corresponding to the highlight condition. The number of consecutive wins of one of the player and the banker increments by one each time the side changes, and a pattern is formed which externally appears to be steps increasing in height. In such a special pattern, the number of consecutive wins of the banker or the player increases in accordance with a given rule, making the user expect that the result of the next card game will be an extension of this rule. In FIG. 16, the player has won the last game. If the player wins the next game, the corresponding icon is placed in the cell "X", and if the banker wins the next game, the corresponding icon is placed in the cell "Y". However, the regularity of this special repeat pattern draws the user and makes the user believe that the player will win the next game again, with the player icon placed in the cell "X".

Thus, the master control unit 100 sets a highlight condition corresponding to the special pattern in which the number of consecutive wins increases in a step-by-step manner, and performs the desired highlighting when the special pattern appears. Highlighting such a pattern facilitates recognition of the special pattern on a particular one of many tables, enabling an increase in the range of tables at which the user selectively places a bet.

14. Highlight Condition in Embodiment 7

Figure 17:
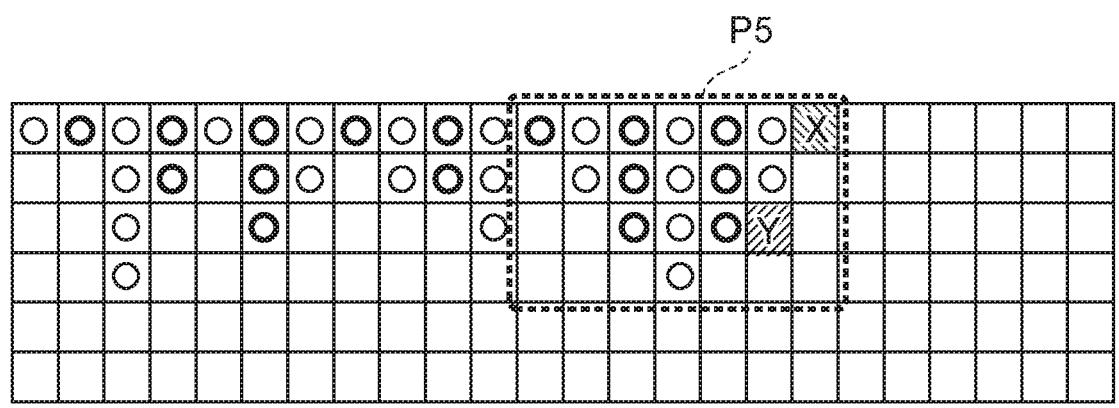
FIG. 17 is a diagram of an example of image display illustrating a highlight condition for a win and loss history according to Embodiment 7.

FIG. 17 depicts an image display example illustrating a highlight condition for win and loss histories according to Embodiment 7. Embodiment 7 relates to a highlight condition different from the highlight condition in the above-described embodiments.

An area P5 enclosed by a dashed line in FIG. 17 is a special pattern corresponding to the highlight condition. A chevron-like pattern appears in which the numbers of consecutive wins of the player and the banker increase each time the game is carried out until a certain column is reached and in which, once that column is reached, the numbers of consecutive wins of the player and the banker decrease each time the game is carried out. In such a special pattern, the number of consecutive wins of the banker or the player increases and decreases in accordance with a given rule, making the user expect that the result of the next card game will be an extension of this rule. In FIG. 17, the banker has won the last game. If the player wins the next game, the corresponding icon is placed in the cell "X", and if the banker wins the next game, the corresponding icon is placed in the cell "Y". However, the regularity of this special repeat pattern draws the user and makes the user believe that the player will win the next game, with the player icon placed in the cell "X".

Thus, the master control unit 100 sets a highlight condition corresponding to the special pattern in which the number of consecutive wins increases and decreases in a chevron form, and the desired highlighting is performed when the special pattern appears. Consequently, the highlight enables the win and loss history representing the special pattern to be recognized, allowing a recommended table to be suggested to the user when the user places, at one of many tables, a bet on a pattern that suits the user's preferences.

15. Effects of the Present Embodiment (1) According to the present embodiment, the highlighting is performed on the win and loss history image corresponding to the win and loss history determined to meet the highlight condition. Thus, even with a large number of tables on which card games are carried out, the user can be effectively notified of the table where the highlight condition is met.

(2) According to the present embodiment, the highlight image is directly added to the win and loss history image for which the highlight condition has been reached. Thus, the table where the highlight condition has been reached can be effectively suggested.

(3) According to the present embodiment, the display mode of the icon is changed which is located at the position in the win and loss history image where the highlight condition is met. The pattern of the win and loss history which has reached the highlight condition can be effectively suggested.

(4) According to the present embodiment, the icon is converted into a moving image and easily discriminated from the other icons not converted into moving images. Thus, the appearance of the pattern in the win and loss history can be effectively suggested to the user.

(5) According to the present embodiment, the icon is converted into a three-dimensional image and easily discriminated from the other icons not converted into three-dimensional images. Thus, the appearance of the pattern in the win and loss history can be effectively suggested to the user.

(6) According to the present embodiment, the character image is generated which corresponds to each of the plurality of games displayed in the win and loss history in juxtaposition, and the display mode of the character image is changed for highlighting. Thus, motion of the character allows simple indication of the card game that has reached the highlight condition.

(7) According to the present embodiment, the illuminating apparatus 110 is driven when the highlight condition is determined to be met. Thus, the highlight based only on images can further be emphasized.

(8) According to the present embodiment, the acoustic apparatus 112 is driven when the highlight condition is determined to be met. Thus, the highlight based only on images can further be emphasized.

16. Variations

In the above-described embodiments, the preset highlight condition is accumulated in the win and loss history database 114, and the win and loss history managing unit 106 determines whether or not to apply the highlight by referencing the highlight condition stored in the win and loss history database 114. However, the present disclosure is not limited to this. For example, the user himself or herself may preliminarily select or make a special highlighting pattern to be highlighted and register the special pattern as a highlight condition. When the user registers the desired highlight condition in this manner, if the special pattern that is the user's own highlight condition appears, the user can allow the display apparatus 350 of the station apparatus 300 operated by the user to display the special pattern. This configuration allows the user to reliably recognize, through the highlight, the table on which the special pattern trusted by the user has appeared.

For the user registration of the highlight condition as described above, the user may selectively designate one of pre-registered special patterns that are highlight conditions or may pre-register a special pattern corresponding to a highlight condition and set by the user. For example, the user may register the user's own special pattern for the win and loss history while viewing a screen displaying the ruled lines representing the win and loss histories on the tables displayed on the sub-displays 240 and the main display 230 as depicted in FIG. 12. Alternatively, the user may register the special pattern while viewing a screen displayed on the display apparatus 350 of each station apparatus 300 and displaying the ruled lines representing the win and loss history on the selected table.

INDUSTRIAL APPLICABILITY

As described above, the image display apparatus can be applied to systems other than the card games comprising the above-described baccarat. For example, the image display apparatus can be applied to a game system which uses no cards but in which a plurality of users participates to repeatedly carry out many rounds of the same game. The present disclosure is applicable to any game system for which it is meaningful to highlight a particular one of a plurality of games to entice the user to participate in the highlighted game.

DESCRIPTION OF REFERENCE NUMBERS

100 Master control unit
100a CPU
100b ROM
100c RAM
102 Card game progress unit
104 Game progress control unit
106 Win and loss history managing unit
108 Image generating unit
110 Illuminating apparatus
112 Acoustic apparatus
114 Win and loss history database (win and loss history storage unit, highlight condition storage unit)
210 Lamp
212 Light emitting diode
220 Speaker
230 Main display
240 Sub-display
300 Station apparatus

What is claimed is:
1. A game system comprising:
a master control unit having a central processing unit (CPU) and memory; and
a plurality of game units, each of the plurality of game units being configured to progress a game over a plurality of rounds;
wherein the master control unit comprises:
a game progress control unit that configures the CPU to allow the plurality of game units to progress and output game result information that indicates whether a player has won, lost, or tied in each of the plurality of rounds;
a win and loss history managing unit that configures the CPU to manage a win and loss history of each of the plurality of game units by storing and updating win and loss history information stored in a win and loss history storing area corresponding to each of the plurality of game units in a memory each time when new game result information is received; and
an image generating unit that configures the CPU to read out each of the win and loss history information from the win and loss history storing area corresponding to each of the plurality of game units, generate an icon image that represents any of win, loss, or tie that the win and loss history information indicates, and generate a win and loss history image that represents the win and loss history for each of the plurality of game units by lineups of the icon images,
wherein the image generating unit further configures the CPU to determine whether the win and loss history meets a predetermined highlight condition, and to perform highlighting on the win and loss history image corresponding to the win and loss history determined to meet the highlight condition;
wherein the highlighting includes changing a display mode of a plurality of the icon images displayed at a position where the highlight condition is met;
wherein changing the display mode of the plurality of the icon images includes highlighting the plurality of icon images that match a predetermined condition to indicate reaching the predetermined condition;
wherein changing the display mode of the plurality of the icon images includes changing the plurality of icon images that have matched the predetermined condition into another image.

2. The game system according to claim 1, further comprising:
a highlight condition storage unit which pre-stores the highlight condition; and
a highlight condition input unit which receives and stores a new highlight condition in the highlight condition storage unit,
wherein the win and loss history managing unit determines whether the win and loss history meets one or more highlight conditions stored in the highlight condition storage unit.

3. The game system according to claim 1, wherein the game progress control unit allows the plurality of games to progress in synchronism.

4. The game system according to claim 1, wherein the highlighting includes adding a highlight image for predetermined highlighting to the corresponding win and loss history image.

5. The game system according to claim 1, wherein the display mode of the plurality of icon images is one or more of:
1) a moving image into which the plurality of icon images is converted;
2) a three-dimensional image into which the plurality of icon images is converted; and
3) an animated image of an area containing the plurality of icon images.

6. The game system according to claim 1, wherein
the image generating unit generates a character image that corresponds to each of the plurality of games and is displayed along with the win and loss history, and
the highlighting includes changing a display mode of the character image displayed along with the corresponding win and loss history image.

7. The method of claim 1, wherein generating the win and loss history image that represents the win and loss history for each of the plurality of game units by lineups of the icon images comprises displaying the icon images arranged in series in a grid.

8. The game system according to claim 1, wherein the other image is an animated image.

9. An image display method for a game system, the method comprising the steps of:

allowing a plurality of game units to progress a game over a plurality of rounds and outputting game result information that indicates whether a player has won, lost, or tied in each of the plurality of rounds;

managing a win and loss history of each of the plurality of game units by storing and updating win and loss history information stored in a win and loss history storing area corresponding to each of the plurality of game units in a memory each time when new game result information is received;

reading out each of the win and loss history information from the win and loss history storing area corresponding to each of the plurality of game units; and generating a win and loss history image that represents the win and loss history for each of the plurality of game units by lineups of the icon images, wherein the step of managing the win and loss history includes determining whether the win and loss history meets a predetermined highlight condition, and the step of generating the win and loss history image includes performing highlighting on the win and loss history image corresponding to the win and loss history determined to meet the highlight condition;

wherein the step of highlighting includes changing a display mode of a plurality of the icon images displayed at a position where the highlight condition is met.

* * * * *